(12) United States Patent
Giffen (10) Patent No.: US 11,093,426 B1
(45) Date of Patent: Aug. 17, 2021

(54) USB RECEPTICLE CONFIGURATION AND SYSTEM THEREFOR

(71) Applicant: DELL PRODUCTS, LP, Round Rock, TX (US)

(72) Inventor: Jonathan C. Giffen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/825,150

(22) Filed: Mar. 20, 2020

(51) Int. Cl.
*G06F 13/38* (2006.01)
*G06F 13/40* (2006.01)

(52) U.S. Cl.
CPC ........ *G06F 13/382* (2013.01); *G06F 13/4027* (2013.01); *G06F 2213/0042* (2013.01)

(58) Field of Classification Search
CPC .................. G06F 13/382; G06F 13/4027
See application file for complete search history.

(56) References Cited

U.S. PATENT DOCUMENTS

| | | | |
|---|---|---|---|
| 10,355,384 B2 | 7/2019 | Chee et al. | |
| 10,594,101 B2 | 3/2020 | Brower | |
| 10,716,225 B1* | 7/2020 | So | H05K 5/0026 |
| 2016/0371206 A1* | 12/2016 | Maung | G06F 13/20 |
| 2018/0205185 A1* | 7/2018 | Chen | H01R 24/60 |
| 2019/0278731 A1* | 9/2019 | Mattos | G06F 1/3215 |
| 2020/0311009 A1* | 10/2020 | Tu | G06F 13/4282 |

* cited by examiner

*Primary Examiner* — David E Martinez
(74) *Attorney, Agent, or Firm* — Larson Newman, LLP (57) ABSTRACT

A method may include selectively instantiating a bridge conductor component at a first printed circuit board (PCB) pad and a second PCB pad to provide a first universal serial bus (USB) receptacle configuration at an information handling system, the first configuration having a USB type-C receptacle at a first location at the PCB. The method may further include selectively instantiating the bridge conductor component at the first PCB pad and a third PCB pad to provide a second USB receptacle configuration at an information handling system, the second configuration having a USB type-A receptacle at the first location at the PCB. Instantiation of the bridge conductor component at the first and the second PCB pads is mutually exclusive to instantiation of the first bridge conductor component at the first and the third PCB pads.

18 Claims, 5 Drawing Sheets

USB RECEPTICLE CONFIGURATION AND SYSTEM THEREFOR

FIELD OF THE DISCLOSURE

This disclosure generally relates to information handling systems, and more particularly relates to configuration of a USB receptacle at an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include selectively instantiating a bridge conductor component at a first printed circuit board (PCB) pad and a second PCB pad to provide a first universal serial bus (USB) receptacle configuration at an information handling system, the first configuration having a USB type-C receptacle at a first location at the PCB. The method may further include selectively instantiating the bridge conductor component at the first PCB pad and a third PCB pad to provide a second USB receptacle configuration at an information handling system, the second configuration having a USB type-A receptacle at the first location at the PCB. Instantiation of the bridge conductor component at the first and the second PCB pads is mutually exclusive to instantiation of the first bridge conductor component at the first and the third PCB pads.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
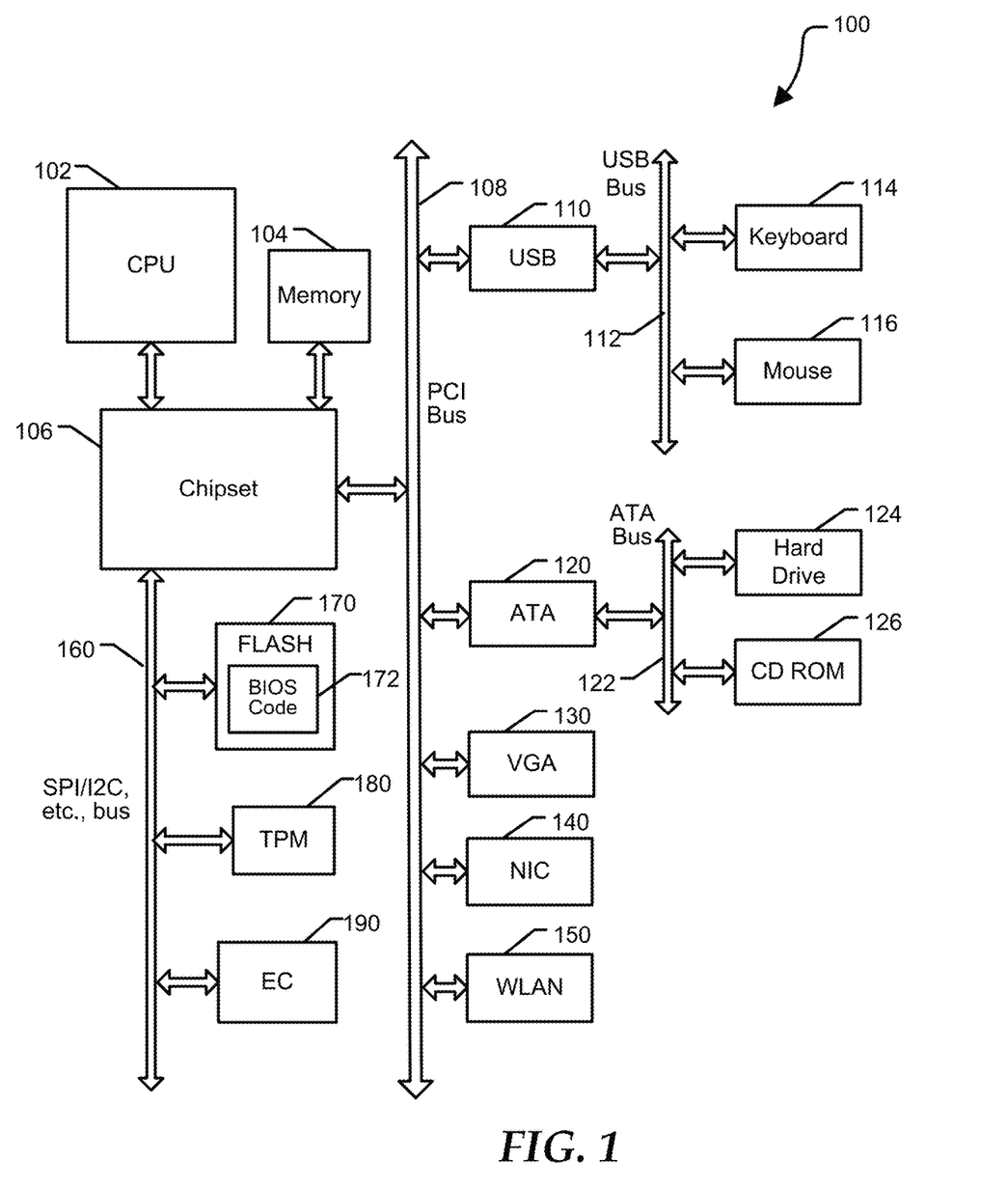
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial busses 160, a non-volatile rand access memory (NVRAM) 170 for storing a basic input/output system (BIOS) 172, a trusted platform module (TPM) 180, and an embedded controller (EC) 190.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more busses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 includes instructions executable by CPU 102 to initialize and test the hardware components of system 100, and to load a boot loader or an operating system (OS) from a mass storage device. BIOS 172 additionally provides an abstraction layer for the hardware, that is a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. In an embodiment, BIOS 172 can provide one or more runtime processes or device drivers that are configured to support functionality disclosed herein. After the initialization procedure is complete and an operating system is loaded, such as Windows, computational operation of information handling system can begin. In an embodiment, the BIOS 172 can be substantially compliant with one or more revisions of the UEFI specification.

USB controller 110 is compliant with an industry standard that establishes specifications for cables, connectors, and protocols for providing communication and power transfer between information handling system 100 and peripheral devices, such as keyboard 114 and mouse 116. The USB protocol specification has evolved since release to now include USB 1.0, 2.0, 3.0, 3.1, 3.1 Gen 1, and 3.1 Gen 2. USB controller 110 can be compliant with one or more of the specification revisions. The USB specification provides a plurality of connectors and corresponding connector receptacles, such as type-A, type-B, type-B SuperSpeed, Micro-B, Micro-B SuperSpeed, type-C, and the like, though some connectors are only compliant with specific protocol specifications. The maximum transmission speed supported by each USB specification has increased over time, reaching speeds of 10 Gbits/s when operating in a 2×1 configuration. Designing USB circuitry that operates at such high speeds is difficult due to signal integrity issues that can arise when routing super-high frequency signals at a printed circuit board.

A manufacturer of information handling systems may provide an array of products, each supporting a particular selection of USB interface capabilities as warranted for different markets. For example, many information handling systems sold today include at least one USB 3.0 compliant type-A SuperSpeed receptacle, while some systems may include a type-C receptacle. High-end systems may provide a USB type-C receptacle that is compliant with USB 3.1 Gen 2. Manufacturers typically utilize a unique printed circuit board to implement each product variation due to the complexity of implementing high speed signal bussing associated with modern USB interfaces. For example, a system supporting USB 3.1 Gen 2 typically requires an additional integrated circuit to perform signal retiming. In addition, a USB type-C receptacle requires an additional switching circuit to replicate high speed data pins on each side of the receptacle. The need for a unique printed circuit board for each product variation is costly from a design, inventory, and regulatory perspective. Techniques disclosed herein allow a single printed circuit board design to be used in products have different USB receptacle configurations.

Figure 2:
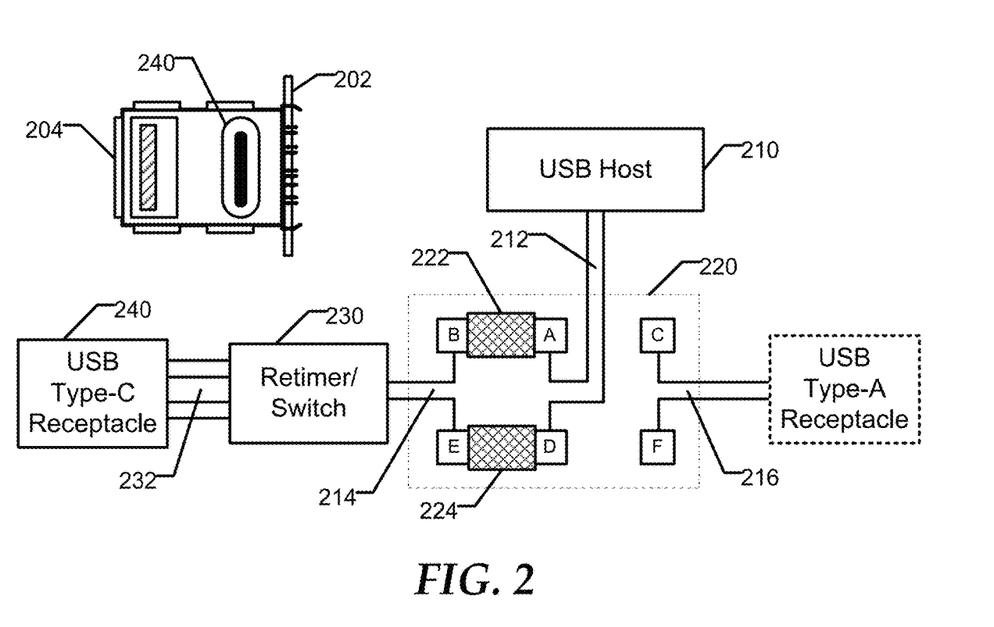
FIGS. 2 and 3 are block diagrams illustrating configuration of a universal serial bus (USB) interface at an information handling system according to specific embodiments of the present disclosure.
Figure 3:
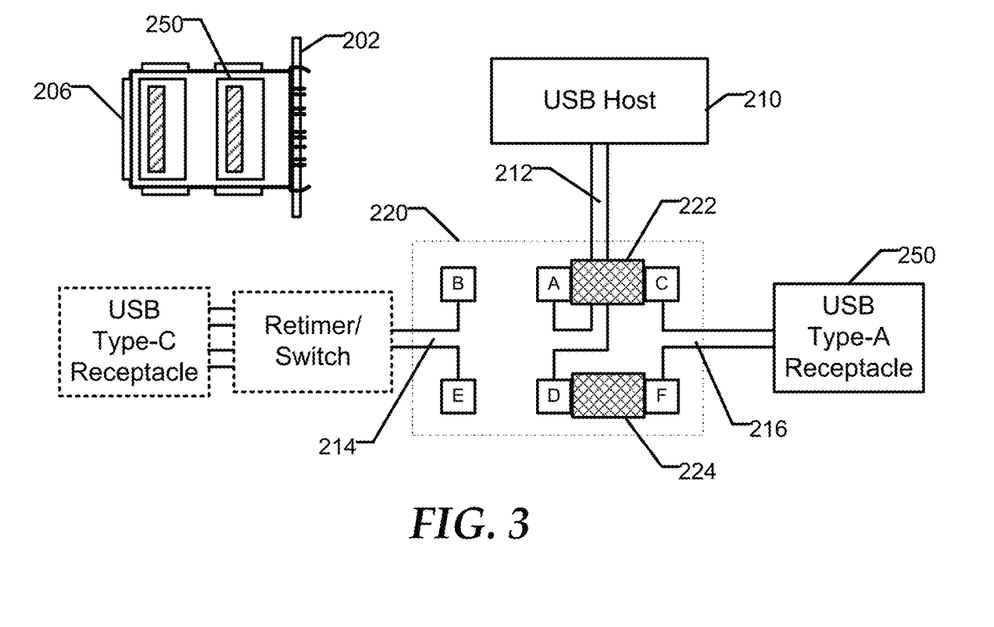

FIGS. 2 and 3 show techniques for configuring a USB interface at information handling system 100 according to specific embodiments of the present disclosure. In particular, FIG. 2 shows a printed circuit board (PCB) 202 configured to provide a USB type-C receptacle 240, while FIG. 3 shows PCB 202 configured to provide a USB type-A receptacle 250. In an embodiment, receptacles 240 and 250 can be included in a dual USB stack arranged in an over/under configuration. For example, FIG. 2 shows USB type-C receptacle 240 and a USB type-A receptacle co-located at a portion of PCB 202, and FIG. 3 shows USB type-A receptacle 250 and another USB type-A receptacle co-located at the same portion of PCB 202.

PCB 202 includes a USB host 210, an array of six PCB pads 220 labeled A, B, C, D, E, and F, a retimer/switch 230, and a USB type-C receptacle 240. USB Host 210 is coupled to PCB pads A and D via a conductor pair 212, PCB pads B and E are coupled to retimer/switch 230 via a conductor-pair 214, retimer/switch 230 is coupled to USB type-C receptacle 240 via two conductor pairs 232, and PCB pads C and F are coupled to PCB pads configured to mount a USB type-A receptacle via conductor-pair 216. FIG. 2 also includes instantiation of a bridge conductor component 222 to electrically couple PCB pad A to PCB pad B, and a bridge conductor component 224 to electrically couple PCB pad D to PCB pad E. Conductor pairs 212 and 214 are configured to propagate a USB Super-speed transmitter differential pair between host 210 and retimer/switch 230. Retimer/switch 230 is configured to compensate for PCB signal loss and other signal distortion, and to generate a second differential transmitter pair. As used herein, a switch refers to a device that performs packet switching to receive and forward data to a destination device. In particular, one pair of differential transmitter signals is coupled to pins located on one side of the type-C receptacle and the other pair of differential transmitter signals is coupled to pins located on the opposite side of the type-C receptacle, so that a USB type-Connector can be inserted into receptacle 240 in either orientation.

Conductor pairs 210 and 212, and PCB pads A-F are each replicated to propagate a USB Super-speed receiver differential pair between host 210 and retimer/switch 230, not shown for clarity. In the configuration shown at FIG. 2, a USB type-A receptacle coupled to conductor pair 216 is not instantiated at PCB 202, as indicated by the dashed lines.

FIG. 3 is similar to FIG. 2, except bridge conductor component 222 is instantiated at PCB 202 to electrically couple PCB pad A to PCB pad C, and bridge conductor component 224 is instantiated at PCB 202 to electrically couple PCB pad D to PCB pad F. In the configuration shown at FIG. 3, retimer/switch 230 and a USB type-C receptacle coupled to conductor pair 232 are not instantiated at PCB 202, as indicated by the dashed lines. Accordingly, PCB 202 can support a configuration including a USB type-C receptacle, or alternatively, a USB type-A receptacle, the configuration based on selectively instantiating bridge conductor components 222 and 224, as shown at FIGS. 2 and 3, respectively.

Figure 4:
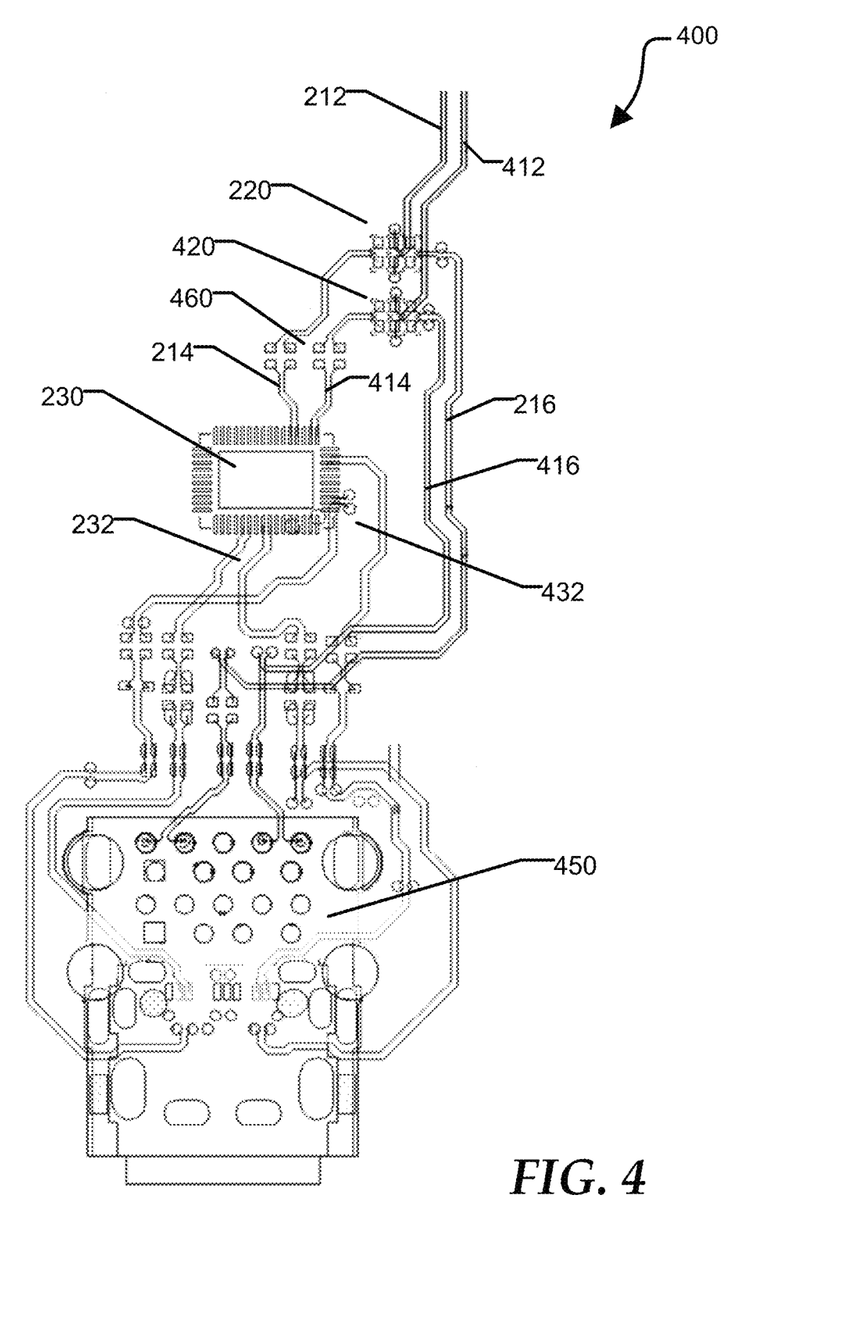
FIG. 4 illustrates a printed circuit board layout to support alternative USB receptacle configurations according to a specific embodiment of the present disclosure.

FIG. 4 shows selected traces at PCB 202 of FIGS. 2 and 3, according to a specific embodiment of the present disclosure. In particular, FIG. 4 shows a plurality of PCB pads 450 at which either a USB type-C, or alternatively, a USB type-A receptacle can be instantiated. In the particular embodiment illustrated at FIG. 4, PCB pads 450 can support a dual stack of USB receptacles as shown at FIGS. 2 and 3. For example, one of either a dual stack having a USB type-A and a USB type-C receptacle or a dual stack having a USB type-A and another USB type-A receptacle can be solder to appropriate PCB pads of PCB pads 450. Bridge conductor components can be instantiated at PCB 202 to selectively couple transmitter and receiver differential pairs from USB host 210 (not shown at FIG. 4) to particular PCB pads of PCB pads 450.

FIG. 4 shows PCB traces 212 for conducting a transmitter differential pair from USB host 210 to PCB pads 220 and PCB traces 412 for a conducting receiver differential pair from USB host 210 to PCB pads 420. In a configuration having a USB type-C receptacle, bridge conductors components 222 and 224 are instantiated at Pads 220 and 420 of PCB 202 as shown at FIG. 2, and in a configuration having a USB type-A receptacle, bridge conductor components 222 and 224 are instantiated at Pads 220 and 420 of PCB 202 as shown at FIG. 3. In the USB type-C configuration, the transmitter and receiver differential pairs are propagated from PCB pads 220 and 420 to retimer/switch 230 via four DC blocking/AC coupling capacitors instantiated at PCB pads 460. The retimed transmitter and receiver differential signal pairs are propagated to PCB pads 450 via traces 232 and 432. In the USB type-A configuration, transmitter and receiver differential pairs are propagated from PCB pads 220 and 420 to PCB pads 450 via traces 216 and 416. PCB 202 can include additional signal routing traces, such as USB 2.0 compliant signals, not shown for clarity.

Figure 5:
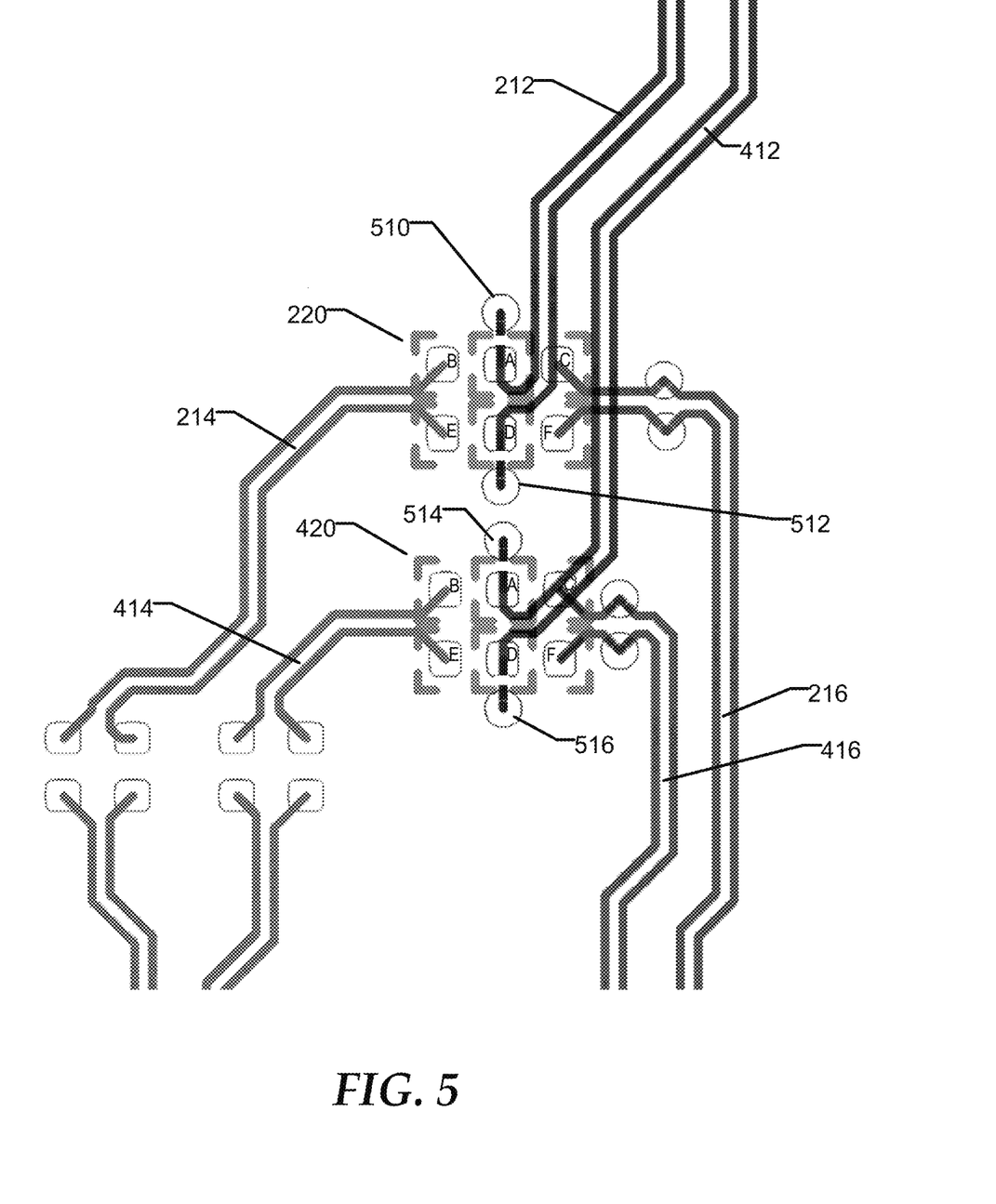
FIG. 5 illustrates a portion of the printed circuit board of FIG. 4 according to a specific embodiment of the present disclosure.

FIG. 5 shows a portion of printed circuit board 202 according to a specific embodiment of the present disclosure. In particular, FIG. 5 shows a detailed view of PCB pads 220 and PCB pads 420. PCB pads 220 includes PCB pads A and D that are connected to PCB traces 212 for conducting the transmitter differential pair from USB host 210 (not shown at FIG. 5). PCB pads 420 includes PCB pads A and D that are connected to PCB traces 412 for conducting the receiver differential pair from USB host 210. As described above, bridge conducting components 222 and 224 can be soldered at pads A and B and at pads D and E to support a USB type-C receptacle at PCB pads 450. Alternatively, bridge conducting components 222 and 224 can be soldered at pads A and C and at pads D and F to support a USB type-A receptacle at PCB pads 450. PCB traces 214, 414, 216, and 416 are described above. FIG. 5 also shows ground reference via 510 positioned immediately adjacent to pad A of PCB pads 220, ground reference via 512 positioned immediately adjacent to pad D of PCB pads 220, ground reference via 514 positioned immediately adjacent to pad A of PCB pads 420, and ground reference via 516 positioned immediately adjacent to pad D of PCB pads 420. The ground reference vias are each connected to a ground reference signal to improve signal integrity of the transmitter and receiver differential pairs as they propagate through PCB pads 220 and 420, respectively, by providing electromagnetic shielding of other signals. By sharing PCB pads A and D for each USB receptacle configuration option, PCB traces that act as radio frequency stubs are eliminated, thus improving signal integrity of the transmitter and receiver differential pairs as they propagate through PCB pads 220 and 420.

Figure 6:
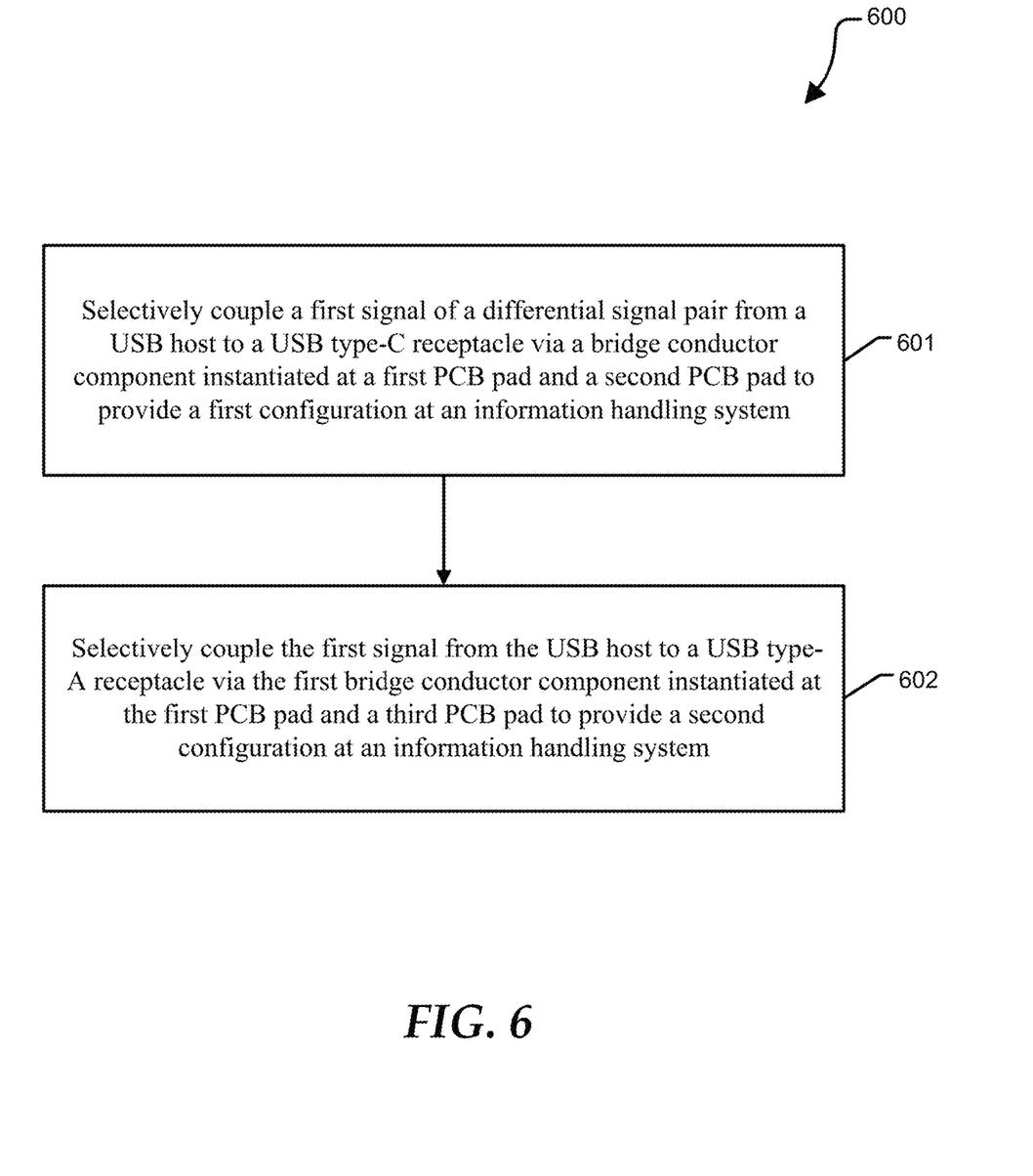
FIG. 6 is a flow diagram illustrating a method for configuring a USB interface according to a specific embodiment of the present disclosure.

FIG. 6 shows a method 600 for configuring a USB interface according to a specific embodiment of the present disclosure. Method 600 begins at block 601 where a first signal of a differential signal pair is selectively coupled from a USB host to a USB type-C receptacle via a bridge conductor component instantiated at a first PCB pad and a second PCB pad to provide a first configuration at an information handling system. For example, bridge conductor component 222 can be soldered between pads A and B of PCB pads 220 as shown at FIG. 2 to propagate a first signal of a USB differential pair to a USB type-C receptacle. Method 600 completes at block 602 where the first signal of the differential signal pair is selectively coupled from the USB host to a USB type-A receptacle via the first bridge conductor component instantiated at the first PCB pad and a third PCB pad to provide a second configuration at an information handling system. For example, bridge conductor component 222 can be soldered between pads A and C of PCB pads 220 as shown at FIG. 3 to propagate the first signal of the USB differential pair to a USB type-A receptacle. Instantiation of the bridge conductor component at the first and the second PCB pads is mutually exclusive to instantiation of the bridge conductor component at the first and the third PCB pads.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication.

Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    selectively coupling a first signal of a differential signal pair from a universal serial bus (USB) host to a USB type-C receptacle via a first bridge conductor component instantiated at a first printed circuit board (PCB) pad and a second PCB pad to provide a first USB receptacle configuration at an information handling system; and
    selectively coupling the first signal from the USB host to a USB type-A receptacle via the first bridge conductor component instantiated at the first PCB pad and a third PCB pad to provide a second USB receptacle configuration at the information handling system,
    wherein instantiation of the first bridge conductor component at the first and the second PCB pad is mutually exclusive to instantiation of the first bridge conductor component at the first and the third PCB pad, and
    wherein the first PCB pad is shared by the first bridge conductor component in each of the first and the second USB receptacle configurations to eliminate a radio frequency stub associated with a layout where the first PCB pad is not shared.

2. The method of claim 1, further comprising selectively coupling the first differential signal to the USB type-C receptacle via a signal retiming circuit instantiated between the first bridge conductor and the USB type-C receptacle.

3. The method of claim 1, wherein the first USB receptacle configuration includes a receptacle stack having the type-C receptacle and a type-A receptacle.

4. The method of claim 1, wherein the second USB receptacle configuration includes a receptacle stack having the type-A receptacle and another type-A receptacle.

5. The method of claim 1, further comprising providing a ground reference via located immediately adjacent to the first PCB pad.

6. The method of claim 1, further comprising:
    selectively coupling a second signal of the differential signal pair from the USB host to the USB type-C receptacle via a second bridge conductor component instantiated at a fourth PCB pad and a fifth PCB pad to provide the first USB receptacle configuration at the information handling system; and selectively coupling the second signal from the USB host to the USB type-A receptacle via the second bridge conductor component instantiated at the fourth PCB pad and a sixth PCB pad to provide the second USB receptacle configuration, wherein instantiation of the second bridge conductor component at the fourth and the fifth PCB pads is mutually exclusive to instantiation of the second bridge conductor component at the fourth and the sixth PCB pads.

7. An information handling system comprising;
a printed circuit board;
a universal serial bus (USB) host providing a first signal of a differential signal pair;
a first printed circuit board (PCB) trace to couple the first signal to a first PCB pad;
a ground reference via located immediately adjacent to the first PCB pad;
a second PCB trace to couple a second PCB pad to a PCB pad associated with a USB type-C receptacle;
a third PCB trace to couple a third PCB pad to a PCB pad associated with a USB type-A receptacle; and
a first bridge conductor component instantiated at the first and at the second PCB pads to provide a first USB receptacle configuration of the information handling system, or alternatively instantiated at the first and at the third PCB pads to provide a second USB receptacle configuration of the information handling system.

8. The information handling system of claim 7, further comprising a signal retiming circuit instantiated between the first bridge conductor and the USB type-C receptacle.

9. The information handling system of claim 7, wherein the first USB receptacle configuration includes a receptacle stack having the type-C receptacle and a type-A receptacle.

10. The information handling system of claim 7, wherein the second USB receptacle configuration includes a receptacle stack having the type-A receptacle and another type-A receptacle.

11. The information handling system of claim 7, wherein the first PCB pad is shared by the first bridge conductor component in each of the first and the second USB receptacle configuration to eliminate a radio frequency stub associated with a layout where the first PCB pad is not shared.

12. The information handling system of claim 7, further comprising:
the USB host providing a second signal of the differential signal pair;
a fourth PCB trace to couple the second signal to a fourth PCB pad;
a fifth PCB trace to couple a fifth PCB pad to a PCB pad associated with a second terminal of the USB type-C receptacle;
a sixth PCB trace to couple a sixth PCB pad to a PCB pad associated with a second terminal of the USB type-A receptacle; and
a second bridge conductor component instantiated at the fourth and the fifth PCB pads to provide the first USB receptacle configuration, or alternatively instantiated at the fourth and the sixth PCB pads to provide the second USB receptacle configuration.

13. A method comprising:
selectively instantiating a first bridge conductor component at a first printed circuit board (PCB) pad and a second PCB pad to provide a first universal serial bus (USB) receptacle configuration at an information handling system, the first configuration having a USB type-C receptacle at a first location at the PCB; and
selectively instantiating the first bridge conductor component at the first PCB pad and a third PCB pad to provide a second USB receptacle configuration at an information handling system, the second configuration having a USB type-A receptacle at the first location at the PCB,
wherein instantiation of the first bridge conductor component at the first and the second PCB pads is mutually exclusive to instantiation of the first bridge conductor component at the first and the third PCB pads, and
wherein the first PCB pad is shared by the first bridge conductor component in each of the first and the second USB receptacle configurations to eliminate a radio frequency stub associated with a layout where the first PCB pad is not shared.

14. The method of claim 13, wherein the first configuration further includes coupling a first signal of a differential signal pair from a USB host to the USB type-C receptacle via the first bridge conductor component and via a signal retiming circuit.

15. The method of claim 13, wherein the second configuration further includes coupling a first signal of a differential signal pair from a USB host to the USB type-A receptacle via the first bridge conductor component.

16. The method of claim 13, wherein the first USB receptacle configuration includes a receptacle stack having the type-C receptacle and a type-A receptacle.

17. The method of claim 13, wherein the second USB receptacle configuration includes a receptacle stack having the type-A receptacle and another type-A receptacle.

18. The method of claim 13, further comprising providing a ground reference via located immediately adjacent to the first PCB pad.

* * * * *